US005459178A

United States Patent [19]
Chan et al.

[11] Patent Number: 5,459,178
[45] Date of Patent: Oct. 17, 1995

[54] FOUNDRY MIXES AND THEIR USES

[75] Inventors: Paul S. L. Chan, Mississauga; Satish S. Jhaveri, Oakville, both of Canada; W. Graham Carpenter, Powell, Ohio

[73] Assignee: Ashland Inc., Columbus, Ohio

[21] Appl. No.: 327,465

[22] Filed: Oct. 21, 1994

[51] Int. Cl.$^6$ .............................. B22C 1/00; C08K 3/10; C08K 3/02
[52] U.S. Cl. .......................... 523/139; 523/141; 523/146; 523/147; 523/148; 524/407; 524/413; 524/437; 524/493; 524/700; 524/729; 525/272; 525/392
[58] Field of Search ..................... 523/139, 141, 523/146, 147, 148; 524/407, 413, 437, 493, 700, 789; 525/272, 392

[56]  References Cited

U.S. PATENT DOCUMENTS

| | | | |
|---|---|---|---|
| 4,366,269 | 12/1982 | Ohkawa et al. | 523/148 |
| 4,568,728 | 2/1986 | Kopac et al. | 525/504 |
| 5,017,649 | 5/1991 | Clemens | 525/59 |
| 5,288,804 | 2/1994 | Kim et al. | 525/154 |
| 5,321,118 | 6/1994 | Hubbs et al. | 528/291 |

*Primary Examiner*—Paul R. Michl
*Assistant Examiner*—LaVonda R. DeWitt
*Attorney, Agent, or Firm*—David L. Hedden

[57]  ABSTRACT

This invention relates to foundry mixes and their uses. The foundry mixes comprise (a) a foundry aggregate, and (b) a foundry binder comprising in admixture; (1) an acetoacetate ester; (2) an $\alpha, \beta$ ethylenically unsaturated monomer; and (3) a liquid tertiary amine catalyst having a pK value of 12–14. The foundry mixes are used to prepare foundry shapes made from foundry mixes by a no-bake process.

19 Claims, No Drawings

5,459,178

FOUNDRY MIXES AND THEIR USES

FIELD OF THE INVENTION

This invention relates to foundry mixes and their uses. The foundry mixes comprise (a) a foundry aggregate, and (b) a foundry binder comprising in admixture: (1) an acetoacetate ester; (2) an $\alpha$, $\beta$ ethylenically unsaturated monomer, preferably an acrylate; and (3) a liquid tertiary amine catalyst having a pK value of 12–14. The foundry mixes are used to prepare foundry shapes made from foundry mixes by a no-bake process.

BACKGROUND OF THE INVENTION

In the foundry industry, one of the processes used for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

One of the processes used in sand casting for making molds and cores is the no-bake process. In this process, a foundry aggregate, binder, and liquid curing catalyst are mixed and compacted to produce a cured mold or core. In the no-bake process, it is important to formulate a foundry mix which will provide sufficient worktime to allow shaping. Worktime is the time between when mixing begins and when the mixture can no longer be effectively shaped to fill a mold or core.

A binder commonly used in the no-bake process is a polyurethane binder derived by curing a polyurethane-forming binder with a liquid tertiary amine catalyst. Such polyurethane-forming binders used in the no-bake process, have proven satisfactory for casting such metals as iron or steel which are normally cast at temperatures exceeding about 1400° C. They are also useful in the casting of light-weight metals, such as aluminum, which have melting points of less than 700° C.

The polyurethane-forming binder usually consists of a phenolic resin component and polyisocyanate component which are mixed with sand prior to compacting and curing. The phenolic resin component generally contain small amounts of free phenol, free formaldehyde and organic solvent, all of which can be obnoxious to smell and can create stress for the environment. Because of this, there is an interest in developing foundry binders which do not contain free phenol, free formaldehyde, and organic solvents.

SUMMARY OF THE INVENTION

This invention relates to foundry mixes comprising:
(a) a foundry aggregate;
(b) a foundry binder comprising in admixture:
  (1) an acetoacetate ester;
  (2) an $\alpha$, $\beta$ ethylenically unsaturated monomer; and
  (3) a liquid tertiary amine having a pK value of 12–14.

The foundry mixes can be used to prepare foundry shapes such as molds and cores by a no-bake process. The binder system is free of formaldehyde, phenol, and organic solvents. Work and strip time, which are dependent on the sand used, can be varied by changes in the catalyst level used. The invention also relates to a process for preparing such foundry shapes and metal castings prepared with such shapes.

DETAILED DESCRIPTION AND BEST MODE

Acetoacetate esters can be prepared according to well known methods by the transesterification of a polyhydroxyl compound with an alkyl, preferably ethyl or t-butyl, acetoacetate to liberate an alkyl alcohol and form the ester. The polyhydroxyl compound, or blends thereof, typically have an average functionality of at least 2. The polyhydroxyl compound and acetoacetate ester are reacted in the presence of triphenylphosphite catalyst at a temperature of 120° C. to 150° C. for 2.5 to 10 hours such that the molar ratio of polyhydroxyl compound to acetoacetate ester is such that there is about one molar equivalent of acetoacetate ester for each molar equivalent of hydroxyl groups.

The polyhydroxy functional group may be derived from any hydroxyl containing compound, for instance 1,3-butane diol, 1,4-butane diol, 1,2-, 1,3- or 1,4-cyclohexanedimethanol, diethylene glycol, dimethylol propionic acid, dipropylene glycol, ethylene glycol, 1,6-hexanediol, hexylene glycol, neopentyl glycol, 1,5-pentanediol, propylene glycol, tetraethylene glycol, triethylene glycol, trimethylene glycol, trimethylpentanediol, glycerine, trimethylol ethane, trimethylol propane, pentaerythritol, and combinations of two or more of these. Preferably used as the polyhydroxyl compound are hydroxyl compounds with an average functionality of 2 to 4 such as glycerine, trimethylol ethane, trimethylol propane, pentaerythritol, and mixtures thereof.

Typical acetoacetates which can be used to prepare the multifunctional acetoacetate esters include methyl acetoacetate, ethyl acetoacetate, and the like. Preferably used is tert-butyl and ethyl acetoacetate.

Examples of acetoacetate esters include cyclohexanedimethanol bis-acetoacetate, glycerol triacetoacetate, neopentyl glycol bis-acetoacetate, ethylene glycol bisacetoacetate, trimethylolpropane trisacetoacetate, pentaerythritol tetrakis-acetoacetate, acetoacetylated polyvinyl alcohols, acetoacetylated polyester resins, and mixtures thereof, preferably glycerol triacetoacetate, trimethylolpropane trisacetoacetate, pentaerythritol tetrakis-acetoacetate.

Preferred $\alpha$, $\beta$ ethylenically unsaturated monomers are ethylenically unsaturated monomers such as pentaerythritol triacrylate, trimethylolpropane triacrylate, 1,6-hexanediol diacrylate, and tetraethylene glycol diacrylate.

The preferred equivalent ratio of acetoacetate ester to $\alpha$, $\beta$ ethylenically unsaturated monomer is from 0.8:1 to 1.2:1.0. One equivalent is defined as the molecular weight divided by the number of reactive functional groups.

It is believed that subject foundry binders are reactive because the alpha, gamma carbonyls of the acetoacetate ester activates the hydrogen on the methylene group of the acetoacetate ester to form a carbanion which is capable of adding across a polarized double bond of an $\alpha$, $\beta$ ethylenically unsaturated compound in a Michael addition. This addition to the multifunctional $\alpha$, $\beta$ ethylenically unsaturated compound produces a cure or crosslinking reaction in the presence of a strong base. Since the reaction occurs only in the presence of strong base, the acetoacetate ester and $\alpha$, $\beta$ ethylenically unsaturated monomer can be blended and are stable until exposed to the strong base. Because of this, the strong basic catalyst (Part I) is preferably applied to the sand first, and the blend of the acetoacetate ester and $\alpha$, $\beta$ ethylenically unsaturated monomer (Part II) are then applied to the sand.

Optional ingredients for the binder include release agents and adhesion promoters, such as silanes described in U.S. Pat. No. 4,540,724 which is hereby incorporated into this disclosure by reference, to improve humidity resistance.

The strong base is a liquid amine catalyst having a $pK_b$ value generally in the range of from 12 to 14. Suitable catalysts which may be used include 1,8-diaza-bicyclo (5.4.0) undecene-7 (POLYCAT DBU), tetramethyl guanidine, 1,4-dihydropyridine, and 2-allyl-N-alkylimidazoline. The term "liquid amine" is meant to include amines which are liquid at ambient temperature or those in solid form which are dissolved in appropriate solvents. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred bases are heterocyclic compounds containing at least one nitrogen atom in the ring structure.

In view of the varying catalytic activity and varying catalytic effect desired, catalyst concentrations will vary widely. In general, the lower the $pK_b$ value is, the shorter will be the worktime of the composition and the faster, more complete will be the cure. Solvents and any acidity present in added ingredients such as sand may affect the catalytic activity. In general, however, catalyst concentrations will be a catalytically effective amount which generally will range from about 0.5 to about 25.0 percent by weight of the blend of acetoacetate ester and $\alpha,\beta$ ethylenically unsaturated monomer, preferably 5.0 percent by weight to 15.0 percent by weight, most preferably 5.0 percent by weight to 15 percent by weight based upon the weight of the acetoacetate ester.

In a preferred embodiment of the invention, the catalyst level is adjusted to provide a worktime for the foundry mix of 3 minutes to 10 minutes, preferably 8 minutes to about 10 minutes, and a striptime of about 4 minutes to 12 minutes, preferably 9 minutes to about 10 minutes. Worktime is defined as the time interval after mixing the acetoacetate ester, $\alpha, \beta$ ethylenically unsaturated monomers, and catalyst with the sand and the time when the foundry shape reaches a level of 60 on the Green Hardness "B" Scale Gauge sold by Harry W. Dietert Co., Detroit, Mich. Striptime is time interval after mixing the acetoacetate ester, $\alpha,\beta$ ethylenically unsaturated monomer, and catalyst and the time when the foundry shape reaches a level of 90 on the Green Hardness "B" Scale Gauge.

Various types of aggregate and amounts of binder are used to prepare foundry mixes by methods well known in the art. Ordinary shapes, shapes for precision casting, and refractory shapes can be prepared by using the binder systems and proper aggregate. The amount of binder and the type of aggregate used is known to those skilled in the art. The preferred aggregate employed for preparing foundry mixes is sand wherein at about 70 weight percent, and preferably at least about 85 weight percent, of the sand is silica. Other suitable aggregate materials for ordinary foundry shapes include zircon, olivine, aluminosilicate, chromite sand, and the like. The amount of aggregate used in the foundry mix is a major amount, generally at least 70 weight percent based on the weight of the foundry mix, more typically 80 weight percent, preferably 85 weight percent, and most preferably from 90 weight percent to 98 weight percent.

In ordinary sand type foundry applications, the amount of binder is generally no greater than about 15% by weight and frequently within the range of about 0.5% to about 10% by weight based upon the weight of the aggregate. Most often, the binder content for ordinary sand foundry shapes ranges from about 0.6% to about 5% by weight based upon the weight of the aggregate in ordinary sand-type foundry shapes.

EXAMPLES

The examples which follow will illustrate specific embodiments of the invention. These examples along with the written description will enable one skilled in the art to practice the invention. It is contemplated that many other embodiments of the invention will be operable besides those specifically disclosed.

In all of the examples, the test specimens, unless otherwise indicated, were produced by the no-bake process using 1,8-diaza-bicyclo (5.4.0) undecene-7 (POLYCAT DBU) as a 50 percent solution in HI-SOL 10. All parts are by weight and all temperatures are in ° C. unless otherwise specified.

Unless otherwise indicated, the foundry mixes were prepared by first mixing the catalyst with the sand for about for 2 minutes. Then the blend of acetoacetate ester and $\alpha, \beta$ethylenically unsaturated monomer were added to the sand and mixed for an additional 2 minutes.

Measuring the tensile strength of the dog bone shapes enables one to predict how the mixture of sand and binder will work in actual foundry operations. Lower tensile strengths for the shapes indicate that the binder reacted more extensively during mixing with the sand prior to forming foundry shapes, and thus were not suitable for forming foundry shapes.

The foundry shapes were stored 1 hour, 3 hours and 24 hours in a constant temperature room at a relative humidity of 50% and a temperature of 25° C. before measuring their tensile strengths. Unless otherwise specified, the tensile strengths were also measured on shapes stored 24 hours at a relative humidity (RH) of 100%.

The following terms were used in the examples:

| | |
|---|---|
| AAE = | acetoacetate ester. |
| AAEP = | acetaoacetate ester of t-butylacetoacetate and pentaerythritol. |
| BOB = | based on binder. |
| BOS = | based on sand. |
| ECOLYN = | blend of TMPTA and Sartomer 349. |
| EUM = | $\alpha, \beta$ ethylenically unsaturated monomer. |
| pbw = | parts by weight. |
| POLYCAT DBU = | 1,8-diaza-bicyclo (5.4.0) undecene-7 as a 50 percent solution in HI-SOL 10. |
| RH = | relative humidity. |
| Sartomer 349 = | is the diacrylate of ethoxylated Bisphenol A. |
| ST = | striptime. |
| TMPTA = | trimethyol propane triacrylate. |
| WT = | worktime. |

Unless otherwise indicated, the AAE used in the examples was a tetraacetoacetate ester of pentaerythritol (AAEP) prepared as follows:

To a reaction vessel, equipped with a stirrer and goose neck take off into a condenser and receiving flask, 88 grams (0.65 mole) of pentaerythritol and 412 grams (2.60 mole) of t-butylacetoacetate were charged. To this mixture was added 0.25 gram (0.05%) of triphenylphosphite as a transesterification catalyst. The mixture was heated up to 150° C. over 2.5 hours. Removal of t-butyl alcohol began at 120° C. and commenced at 150° C. At this point the reaction vessel contained about 191 parts (theoretical=192.5 grams) of t-butyl alcohol. The ester remaining in the vessel was 295 grams (95.9% yield).

In some cases the AAEP was blended with a mixture of TMPTA and Sartomer 349, another α, β ethylenically unsaturated monomer which is the diacrylate of ethoxylated Bisphenol A. This blend is called ECOLYN and has a mole ratio of AAEP/TMPTA/Sartomer of 1.0/0.5/1.2. The AAEP/TMPTA/Sartomer blend was sand tested on Canadian Lake (construction aggregate American sand), U.S. Wedron 5010, Wedron 540, and Manley 1L5W using POLYCAT DBU 15% BOB. The catalyst (Part I) was mixed with the sand, and then the blend (Part II) was added. Results of testing with various types of sand, Examples 1–6, are shown in Table I.

The effect of the level of catalyst used was studied at levels between 7.5% and 15% BOB using POLYCAT DBU. The data in Table III indicate that, when using Wedron 540 sand, 10% to 15% catalyst was preferred with strip times ranging from 1 to 6 minutes. Cure on Manley 1L5W was much slower. The results of varying the catalyst level are shown in Table III in Examples 12–15.

TABLE I

SAND TEST USING ECOLYN BLEND

| Example | Sand | Part I POLYCAT DBU 15% BOB | Part II ECOLYN BLEND 1.5% BOS | WT/ST (Min.) | Tensile Strength, psi | | | 24 Hr @ 100% RH |
|---|---|---|---|---|---|---|---|---|
| | | | | | 1 Hr. | 3 Hr. | 24 Hr. | |
| 1 | Canada Lake | Same | Same | 18/20 | 66 | 115 | 168 | 22 |
| 2 | Canada Lake | Same | Same | xx/35[1] | 44 | 323 (5 Hr.) | 337 (72 Hr.). | — |
| 3 | Wedron 5010 Canada | Same | Same | 7/9 | 74 | 103 | 140 | 15 |
| 4 | Wedron 5010 Canada | Same | Same | 8/10 | 108 | 183 (2 Hr.) | 210 | — |
| 5 | Wedron 540 | Same | Same | xx/6[1] | 79 | 134 | 92 | 0 |
| 6 | Manley 1L5W | Same | Same | xx/15 | 72 | 108 | 128 | 17 |

[1]In some cases strip time occurred so close to work time that work time could not be recorded.

In examples 7–11, the ECOLYN blend was tested at various mole ratios of AAEP, TMPTA, and Sartomer 349 with and without the Sartomer 349. Sand tests were conducted on Canada Lake and Wedron 5010 sand and are summarized in Table II. The best results were obtained using a mole ratio of AAEP/TMPTA/Sartomer 349 of 1.0/1.3/0, i.e. without the Sartomer 349.

TABLE II

EFFECTS OF RATIOS OF AAEP/TMPTA/Sartomer 349
Sand: Manley 1L5W
CT Room: 50% RH @ 25° C.
Sand Lab: 25% RH @ 22° C.
Binder: 1.5% BOS

| Example | Mole Ratio AAEP/TMPTA/ Sartomer 349 | POLYCAT DBU (BOB) | WT/ST (Min.) | Tensile Strength, psi | | | 24 Hr. @ 100% RH |
|---|---|---|---|---|---|---|---|
| | | | | 1 Hr. | 3 Hr. | 24 Hr. | |
| 7 | 1.0/1.3/0 | 15% | xx/11[1] | 189 | 164 | 184 | 47 |
| 8 | 1.0/1.0/0 | 15% | 12/13 | 83 | 119 | 122 | 30 |
| 9 | 1.3/1.0/0 | 15% | 14/16 | 29 | 38 | 44 | 19 |
| 10 | 1.0/1.0/0.5 | 15% | 9/10 | 183 | 197 | 185 | 37 |
| 11 | 1.0/0.5/1.2 | 15% | xx/15[1] | 72 | 108 | 128 | 17 |

[1]In some cases strip time occurred so close to work time that work time could not be recorded.

TABLE III

EFFECT OF CATALYST LEVEL ON CURE OF RESIN
Sand: 4000 parts Wedron 540
Catalyst: 50% solution of DBU in HI SOL 10
CT Room: 50% RH @ 25° C.
Sand Lab: 25% RH @ 22° C.
Binder: 1.5% BOS

| Example | Part I POLYCAT DBU (BOB) | Part II ECOLYN Blend | WT/ST (Min.) | Tensile Strength, psi | | | 24 Hr. @ 100% RH |
|---|---|---|---|---|---|---|---|
| | | | | 1 Hr. | 3 Hr. | 24 Hr. | |
| 12 | 15% | Same | xx/6 | 79 | 134 | 92 | 0 |
| 13 | 7.5% | Same | ¹19/24 | 61 | 148 | 176 | 21 |
| 14 | 10% | Same | 9/11 | 78 | 116 | 131 | 7 |
| 15 | 15% | Same | xx/15 | 72 | 108 | 128 | 17 |

¹Manley 1L5W sand used in Example 15.

Core wash resistance was evaluated on a binder made with a Part II consisting of a 1.0/1.3 mole ratio of AAEP/TMPTA. Tensile strengths of the cores were good in normal sand tests. After dipping in CERAMCOTE ZWK-20-A core wash, test specimens were dried for 15 minutes at about 180° C. and tested hot and after cooling for one hour. Hot tensiles were poor, but the cooled test specimens had very high strength. See Example 16 of Table IV.

Iron castings were improved when Ceramcote ZWK-20A was used as a core wash for cores made with the binders. Castings improved when both air dried and oven dried cores were tested for erosion, veining, and penetration, although erosion was excellent for air dried cores, but very poor for oven dried cores. Penetration castings on Manley 1L5W sand compared favorably with cores prepared with commercially available binders.

TABLE IV

EFFECT OF CORE WASH ON CORES MADE WITH BINDERS
Sand: Wedron 540
CT Room: 50% RH @ 25° C.
Sand Lab: 25% RH @ 21° C.
Binder: 1.5% BOS
Catalyst: 15% BOB 30/70 for DBU/HI-SOL 10

| Example | pbw Part I 15% BOB | pbw Part II 1.5% BOS | WT/ST (Min.) | Tensile Strength, psi | | | Coated Hot Immediate | Coated Cooled 1 Hr. |
|---|---|---|---|---|---|---|---|---|
| | | | | 1 Hr. | 3 Hr. | 24 Hr. | | |
| 16 | 11.3 | 75 | 10.5/12.3 | 139 | 164 | NA | 20 | 234 |

We claim:

1. A foundry mix comprising in admixture:
   (a) a major amount of foundry aggregate;
   (b) a foundry binder comprising as separate components:
   (1) an acetoacetate ester;
   (2) an α, β ethylenically unsaturated compound; and
   (3) a liquid tertiary amine catalyst having a pK value of 12 to 14.

2. The foundry mix of claim 1 wherein components (b) (1) and (b) (2) are mixed together as a blend to form a separate component.

3. The foundry mix of claim 2 which is prepared by first mixing said aggregate with said liquid tertiary amine and then mixing said blend comprising components (b) (1) and (b) (2).

4. The foundry mix of claim 3 wherein the α, β ethylenically unsaturated monomer is selected from the group consisting of pentaerythritol triacylate, trimethylolpropane triacrylate, 1,6-hexanediol diacrylate, and tetraethylene glycol diacrylate.

5. The foundry mix of claim 4 wherein the acetoacetate ester is selected from the group consisting of pentaerythritol tetrakis-acetoacetate, glycerol triacetoacetate, trimethylolpropane tris-acetoacetate, acetoacetylated polyester resins, and mixtures thereof.

6. The foundry mix of claim 5 wherein the equivalent ratio of acetoacetate ester to α, β ethylenically unsaturated monomer is from 0.8:1.0 to 1.2:1.0.

7. The foundry mix of claim 6 wherein the acetoacetate ester also contains a low molecular weight polyester and/or acetoacetylated polyester.

8. A process for preparing a foundry mix comprising the sequential steps of:
   (a) mixing a tertiary amine catalyst having a pK value of 12 to 14 with a foundry aggregate; and
   (b) mixing a blend comprising:
   (1) an acetoacetate ester; and
   (2) an α, β ethylenically unsaturated compound with said mixture (a).

9. The process of claim 8 wherein the α, β ethylenically unsaturated monomer is selected from the group consisting of pentaerythritol triacylate, trimethylolpropane triacrylate, 1,6-hexanediol diacrylate, and tetraethylene glycol diacrylate.

10. The process of claim 9 wherein the acetoacetate ester is selected from the group consisting of pentaerythritol tetrakis-acetoacetate, glycerol triacetoacetate, trimethylolpropane tris-acetoacetate, acetoacetylated polyester resins, and mixtures thereof.

11. The process of claim 10 wherein the equivalent ratio of acetoacetate ester to α, β ethylenically unsaturated monomer is from 0.8:1.0 to 1.2:1.0.

12. The foundry process of claim 11 wherein the acetoacetate ester also contains a low molecular weight polyester and/or acetoacetylated polyester.

13. A no-bake process for the fabrication of foundry shapes comprising:
  (a) mixing tertiary amine catalyst having a pK value of 12 to 14 with a foundry aggregate; and
  (b) mixing a blend comprising:
    (1) an acetoacetate ester; and
    (2) an α, β ethylenically unsaturated compound with the mixture (a);
  (c) introducing the foundry mix obtained from step (b) into a pattern;
  (d) allowing the foundry mix to harden in the pattern until it becomes self-supporting; and
  (d) thereafter removing the shaped foundry mix of step (d) from the pattern and allowing it to further cure, thereby obtaining a hard, solid, cured foundry shape.

14. The process of claim 13 wherein the α, β ethylenically unsaturated monomer is selected from the group consisting of pentaerythritol triacylate, trimethylolpropane triacrylate, 1,6-hexanediol diacrylate, and tetraethylene glycol diacrylate.

15. The process of claim 14 wherein the acetoacetate ester is selected from the group consisting of pentaerythritol tetrakis-acetoacetate, glycerol triacetoacetate, acetoacetylated trimethylolpropane tris-acetoacetate, acetoacetylated polyester resins, and mixtures thereof.

16. The process of claim 15 wherein the molar ratio of acetoacetate ester to α, β ethylenically unsaturated monomer is from 0.8:1.0 to 1.2:1.0.

17. The process of claim 16 wherein the acetoacetate ester also contains a low molecular weight polyester and/or acetoacetylated polyester.

18. A process for casting a low melting metal which comprises:
  (a) fabricating a shape in accordance with claim 14;
  (b) pouring said low melting metal while in the liquid state into and around said shape;
  (c) allowing said low melting metal to cool and solidify; and
  (d) then separating the molded article.

19. A metal casting prepared in accordance with claim 18.

* * * * *